United States Patent [19]

Masanaga et al.

[11] Patent Number: 5,115,269
[45] Date of Patent: May 19, 1992

[54] CAMERA HAVING LUMINANCE DIFFERENCE MODE CONTROL

[75] Inventors: Yamamoto Masanaga; Kaneko Kiyotaka; Yoshida Masanori; Miyake Izumi, all of Tokyo, Japan

[73] Assignee: Fuji Photo Film Co., Ltd., Kanagawa, Japan

[21] Appl. No.: 610,874

[22] Filed: Nov. 9, 1990

[30] Foreign Application Priority Data

Nov. 13, 1989 [JP] Japan .................... 1-294535

[51] Int. Cl.⁵ .................. G03B 7/00; G03B 15/03
[52] U.S. Cl. .................. 354/420; 354/429; 354/421
[58] Field of Search ............... 354/429, 414, 432, 433, 354/434, 419, 420, 421, 422, 423; 358/228, 225

[56] References Cited
U.S. PATENT DOCUMENTS 4,984,006  1/1991  Ikemura et al. .................. 354/414

Primary Examiner—W. B. Perkey
Assistant Examiner—Cassandra C. Spyrou
Attorney, Agent, or Firm—Sughrue, Mion, Zinn Macpeak & Seas

[57] ABSTRACT

In a camera in which a luminance difference between the luminance of a subject and the luminance of the subject background is discriminated by using a predetermined first threshold value and a photographic mode is selected in conformity with the results of this discrimination and distance to the subject, the first threshold value is varied in dependence upon the distance to the subject. The luminance difference between the subject and the background is judged when the average luminance of the entire imaged region is greater than a second threshold value, and the photographic mode is selected based upon the results of judgment and the distance to the subject. Furthermore, when the luminance difference between the subject and the background is large and the distance to the subject is short, the luminance of the subject is measured by spot photometry and exposure is controlled based upon the spot photometric value.

9 Claims, 5 Drawing Sheets

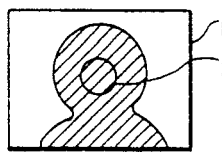
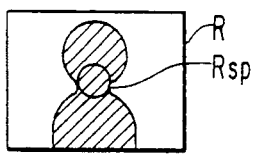
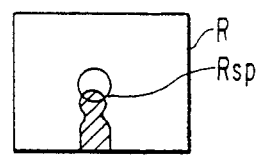
FIG. 4a  FIG. 4b  FIG. 4c
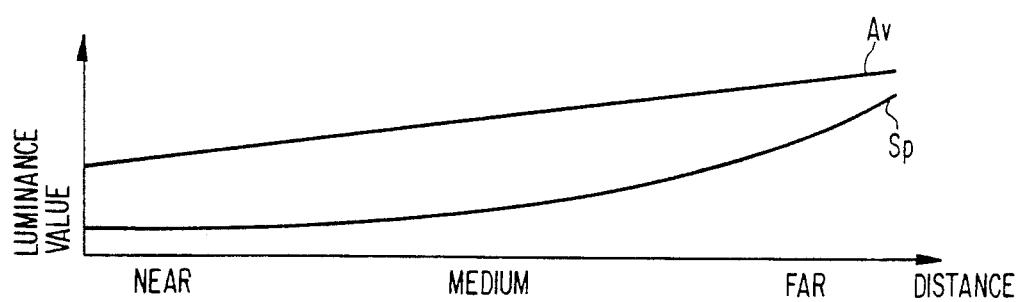
FIG. 4d
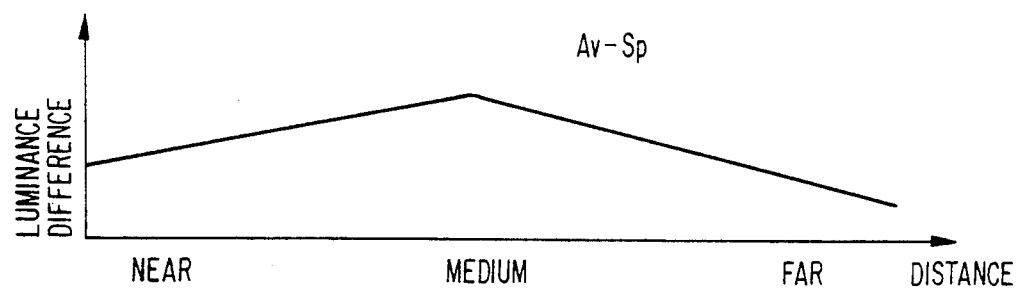
FIG. 4e
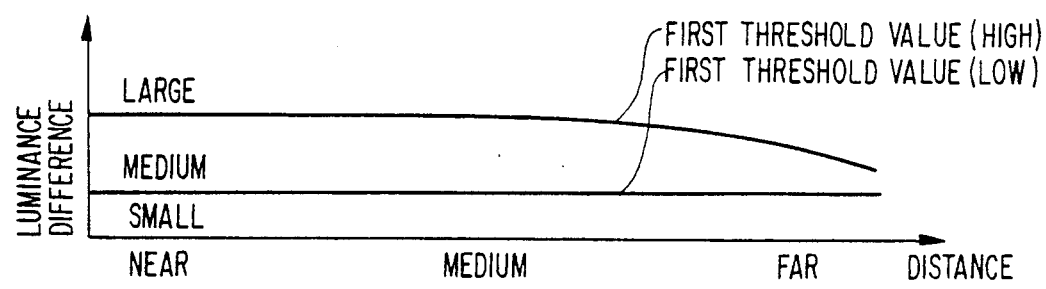
FIG. 4f

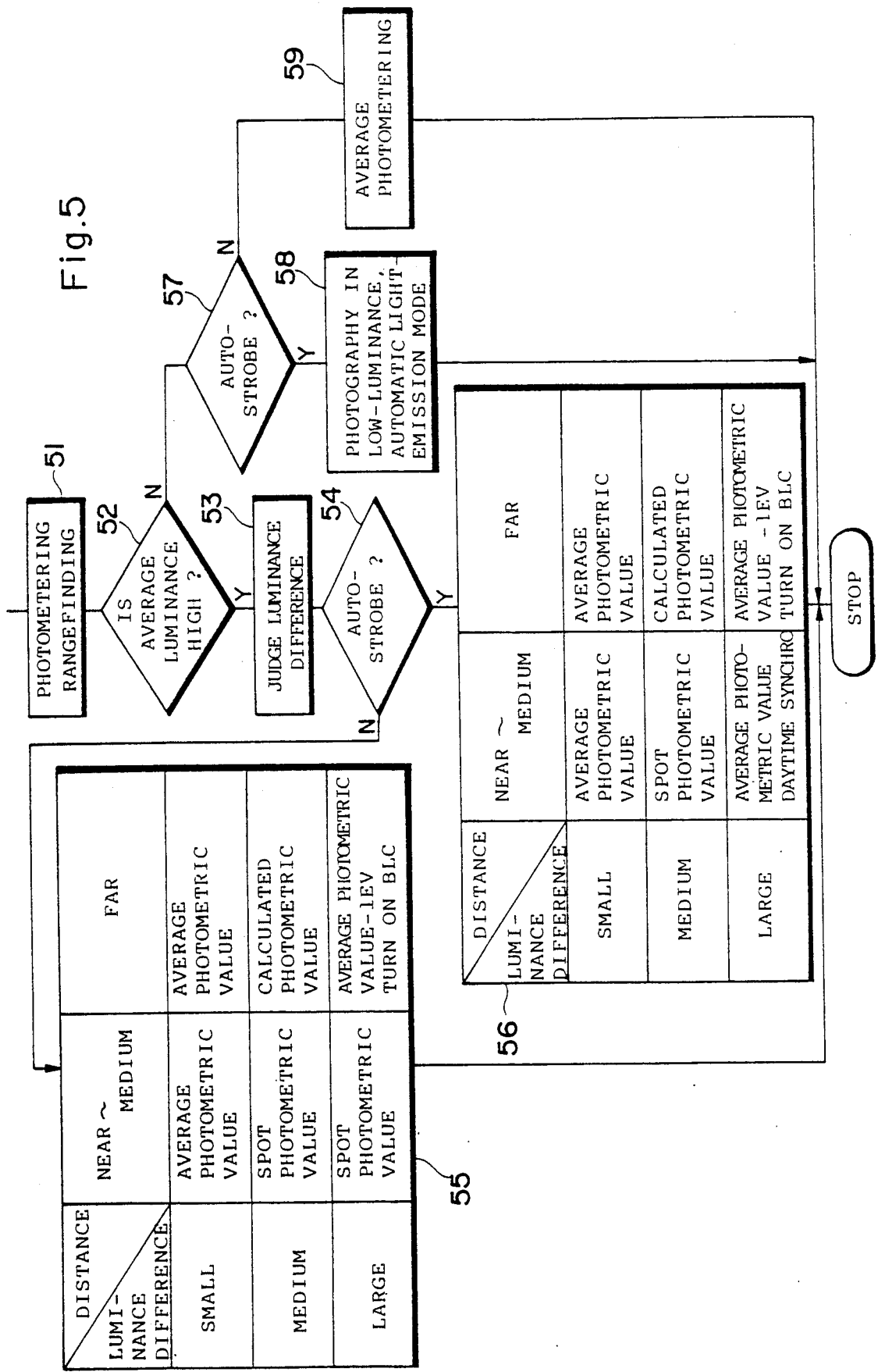

CAMERA HAVING LUMINANCE DIFFERENCE MODE CONTROL

BACKGROUND OF THE INVENTION

1. Field of the Invention

This invention relates to a camera capable of divided photometry in which a visual field is divided into two or more regions and the luminance of incident light is measured in every region. More particularly, the invention relates to a camera having an electronic solid-state image device, such as a still-video camera (an electronic still-video camera) which records a still-video signal on a video floppy, a digital still-camera in which a still-video signal is converted into digital image data that is then stored in a memory, a movie video camera, etc.

2. Description of the Related Art

In divided photometry, there are various methods through which the area in a visual field can be divided. One is to perform photometry upon dividing luminance into that of the central portion of a visual field and that of the background of the field. This is suited to photographic composition in which the subject is a person and the subject is placed substantially at the center of the visual field. The luminance of the central portion is referred to as the spot photometric value or spot luminance, and the average luminance of the background and central portion is referred to as the average photometric value or average luminance.

In order to obtain an appropriate photographic image, it is necessary to consider the difference (luminance difference) between the spot luminance and the average luminance. For example, in a case where a small subject at the central portion is dark and the background is bright, the background will appear almost white if exposure is controlled in conformity with the luminance of the subject. This problem becomes particularly pronounced since dynamic range is comparatively narrow in a camera equipped with a solid-state electronic imaging device, such as a CCD, as the imaging means.

Thus, in order to obtain a suitable photographic image, it is necessary to change the photographic mode (i.e., exposure control based upon spot luminance, exposure control based upon average luminance, whether a strobe light emission is necessary, whether backlight control, described later, is necessary, etc.) in dependence upon the luminance difference between spot luminance and average luminance. At such time, it is necessary to take into consideration the fact that the luminance difference varies depending upon distance as well. For example, in a case where the subject is nearby, spot luminance represents the luminance of the subject. However, if the subject is in the distance, the subject appears small and the background also enters the spot-luminance measurement area of the photometric element. As a result, spot luminance no longer represents the luminance of the subject correctly.

Furthermore, in a camera having a solid-state electronic imaging device as an imaging means, the video signal is displayed on a display unit such as a CRT as is (though the signal is temporarily stored on a recording medium). As a result, it is necessary to detect absolute luminance correctly and to perform exposure control conforming to the absolute luminance.

SUMMARY OF THE INVENTION

An object of the present invention is to provide a camera in which the luminance difference between the subject and the background is capable of being judged appropriately in dependence upon the distance to the subject.

Another object of the present invention is to provide a camera which performs exposure control by taking absolute luminance into consideration.

Still another object of the present invention is to provide a camera in which a nearby subject is capable of being photographed appropriately without using a strobe.

According to the present invention, the foregoing objects are attained by a camera including first photometry device for measuring average luminance of the entirety of an imaged region in a visual field of an imaging optical system, including a second photometry device for measuring spot luminance of a specific small region corresponding to a subject in the imaged region, an arithmetic device for calculating the difference between the average luminance and the spot luminance, a rangefinding device measuring the distance to the subject, and a circuit for discriminating the luminance difference with respect to a predetermined threshold value, and selecting a suitable photographic mode based on the results of the discrimination and the distance. The threshold value for discriminating the luminance difference is varied based on the distance measured by the rangefinding device.

In accordance with the present invention, a camera is provided in which the luminance difference between average luminance and spot luminance is discriminated by using a predetermined threshold value, and a suitable photographic mode is selected based on the results of discrimination. The camera is so adapted that the threshold value is varied in dependence upon the distance to the subject. This makes it possible to fully cope particularly with a situation in which spot luminance does not represent subject luminance correctly because the subject is far away and the background is included in the spot-luminance measurement area. As a result, it is possible to select the appropriate photographic mode.

In another aspect of the present invention, the foregoing objects are attained by a camera including first photometry device, the second photometry device, the arithmetic circuit, the rangefinding device. The camera also includes a device for discriminating the luminance difference by using a predetermined first threshold value, and selecting a suitable photographic mode in dependence upon results of the discrimination and the distance, and a device for discriminating the average luminance by using a predetermined second threshold value. When the average luminance is greater than the second threshold value, calculation of the luminance difference and selection of a photographic mode based upon this luminance difference and the measured distance are performed.

If the average luminance is high, this includes also a case in which there is a partially dark portion (e.g., a case where the subject is dark), and therefore it is necessary to correctly ascertain the luminance distribution of the overall image. In accordance with the present invention, a photographic mode which takes into consideration the luminance difference between spot luminance and average luminance is selected if the average luminance is high. As a result, an excellent picture can be obtained at all times.

In still another aspect of the present invention, the foregoing objects are attained by a camera including a first photometry device, a second device, an arithmetic device for calculating the difference between average and spot luminance, rangefinding device, and a determining device for determining that luminance difference is large based upon the luminance difference and that distance to the subject is short based upon the measured distance, wherein exposure control is performed based upon the spot luminance if the determination performed by the determining device indicates that the luminance difference is large and the measured distance is short.

According to the present invention, exposure control is performed based upon the subject luminance when the luminance difference between the subject and the background is large and the subject photographed is nearby. This makes it possible to photograph a subject appropriately without using a strobe.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4a through 4f are diagrams showing that the relationship between a subject and a photometered region changes depending upon distance, and that a luminance value and a first threshold value vary depending upon distance; and FIG. 5 is a flowchart showing the processing procedure of a control unit.

DESCRIPTION OF THE PREFERRED EMBODIMENTS

Embodiments in which the present invention is applied to a still-video camera (an electronic still-video camera) will now be described in detail.

Figure 1:
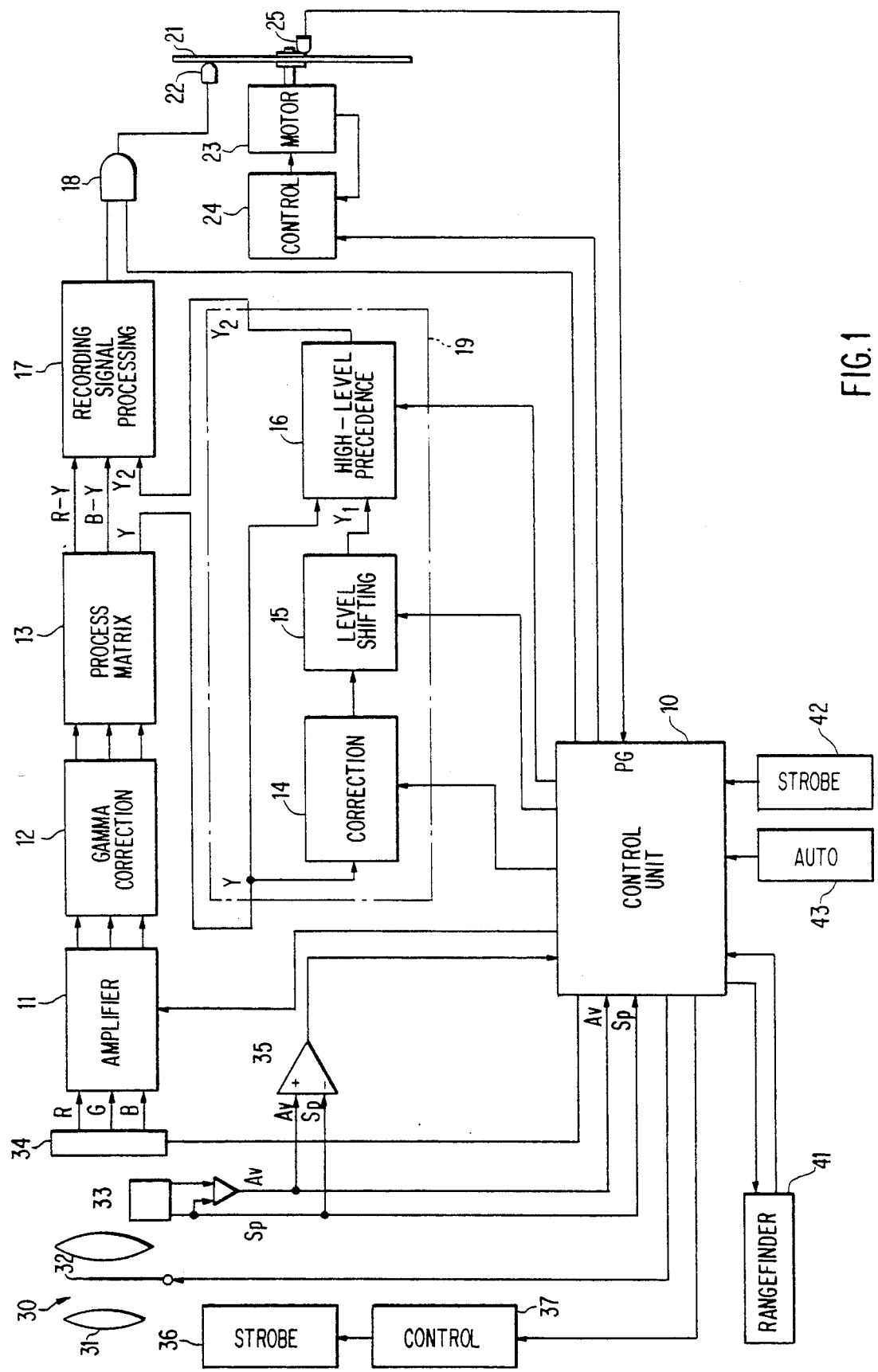
FIG. 1 is a block diagram illustrating an embodiment of the present invention.

FIG. 1 illustrates part of the electronic construction of a still-video camera.

The overall operation of the still-video camera is controlled by a control unit 10, which comprises a CPU, a memory, an interface, etc.

Figure 3:
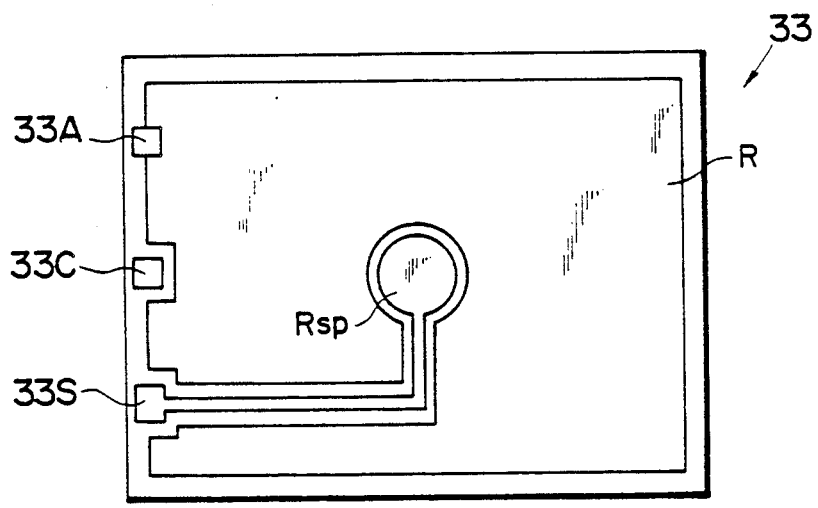
FIG. 3 illustrates the photometric region of a photometric element.

An imaging optical system 30 comprises an imaging lens system 31 for forming an imaged region including a subject, a diaphragm 32 and a shutter (not shown but also capable of being realized by an electronic shutter system, as will be described later). The diaphragm 32 is controlled by the control unit 10. A photometric element 33 for measuring the luminance of incident light is arranged in the imaging optical system 30. It is permissible to place the photometric element 33 in another optical system, e.g., the optical system of a viewfinder. As shown in FIG. 3, the photometric element 33 has a large light-receiving region R covering substantially the entirety of the light-receiving surface of the element, and a small light-receiving region $R_{SP}$ situated substantially at the central portion of the light-receiving surface and insulated from the large light-receiving region R. A signal indicative of the light received by the large light-receiving region R is output from a terminal 33A, and a signal indicative of the light received by the small light-receiving region $R_{SP}$ is output from a terminal 33S. A terminal 33C is a common terminal. The signal indicative of the light received by the large light-receiving region R and a signal indicative of the light received by the small light-receiving region $R_{SP}$ are added by an adder 36 to obtain a signal representing the average luminance Av of the entire imaged region. The signal indicative of the light received by the small light-receiving region $R_{SP}$ represents the spot luminance Sp of a small region corresponding to the imaged position of the subject of the imaged region. The signals representing the average luminance Av and spot luminance Sp are applied to the control unit 10 and enter a differential circuit 35 which calculates the difference between the average luminance Av and the spot luminance Sp. The output of the differential circuit 35 also is fed into the control unit 10. It is permissible for the functions of the adder 36 and differential circuit 35 to be realized by a CPU in the control unit 10. Further, a rangefinder unit 41 is provided for measuring the distance to the subject. Rangefinding data from the unit 41 enters the control unit 10.

The control unit 10 discriminates the luminance difference, which is provided by the differential circuit 35, using a predetermined first threshold value. In this embodiment, the first threshold value is of two types, namely high and low, and the luminance difference is divided into three stages, namely large, medium and small. The general criteria (since the first threshold value varies in dependence upon the measured distance, as will be described later) are that an EV (exposure value) of less than 0.5 represents a small luminance difference (inclusive of no luminance difference), an EV of 0.5-1.5 represents a medium luminance difference, and an EV of greater than 1.5 represents a large luminance difference.

The control unit 10 discriminates the average luminance Av using a second threshold value. If the average luminance Av is greater than the second threshold value (i.e., if the average luminance is large), processing for selecting a photographic mode is performed based upon the results of judging the luminance difference and the data indicative of the measured distance, as will be described below.

The data indicative of the measured distance from the rangefinder unit 41 also is divided into near (short distance), medium (intermediate distance) and far (long distance). In the processing for selecting the photographic mode, near and medium distances are treated as being equivalent, as will be set forth.

A solid-state imaging device 34 such as a CCD is arranged in the focal plane of the optical system 30. The device 34 outputs color signals of the three primary colors R (red), G (green) and B (blue) representing the image obtained by imaging. The color signals representing the subject are read in synchronism with a synchronizing signal provided by the control unit 10, and the read signals enter a process matrix circuit 13 via a preamplifier circuit (not shown), a variable-gain amplifier circuit (a color balance adjusting circuit) 11 and a gamma correcting circuit (a gradation correcting circuit) 12. A luminance signal Y and two color-difference signals R−Y, B−Y are produced by the circuit 13. The luminance signal Y enters a backlight control (BLC) circuit 19 and is outputted as a luminance signal Y2 following processing in a manner described later. The luminance signal Y2 and the two color-difference signals R−Y, B−Y next enter a recording-signal processing circuit 17. The latter, which includes a line sequencing circuit, a pre-emphasis circuit, a frequency modulating (FM) circuit and a mixing circuit, outputs a frequency-modulated mixed video signal, which is delivered to a gate 18 for recording control purposes.

A video floppy 21 is rotatively driven at a fixed speed of, e.g., 3600 rpm by a disk motor 23. The video floppy 21 is contacted by a recording magnetic head 22. Arranged close to the core of the video floppy is a phase detector 25 which generates one phase-detection signal PG whenever the video floppy 21 makes one complete revolution. The magnetic head 22 is positioned diametrically with respect to the video floppy 21, and is positioned on a prescribed track thereof, by a transfer mechanism. The phase-detection pulses PG are applied to the control unit 10.

If an electronic shutter system is adopted, the signal charge storage time of the solid-state electronic imaging device is controlled by the control unit 10.

A strobe 36 and a strobe control circuit 37 for driving the strobe 36 are provided in order to perform strobe photography. A strobe light-emission can be set made mandatory strobe setting switch 42. When an auto-strobe mode is selected by a switch 43, whether or not a strobe light-emission is to be performed is decided by the control unit 10 in accordance with the prevailing circumstances, as will be discussed later.

The backlight control (BLC) processing circuit 19 will be described next. The backlight control processing circuit 19 comprises a correcting circuit 14, a level shifting circuit 15 and a high-level precedence circuit 16.

Figure 2A:
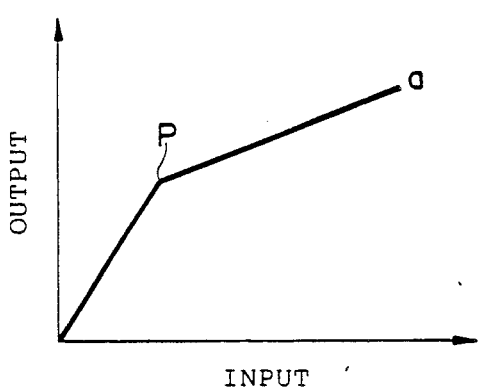
FIGS. 2a through 2d are graphs showing input/output characteristics of a backlight control circuit.
Figure 2B:
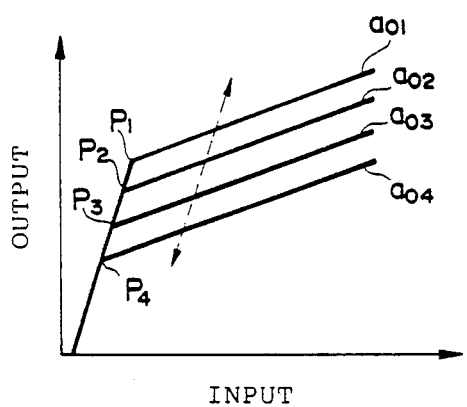

The luminance signal Y outputted by the matrix circuit 13 enters the correcting circuit 14. As shown in FIG. 2a, the latter possesses an input/output characteristic represented by a broken line the slope whereof changes at an alteration point P. The position of the alteration point P of the input/output characteristic can be changed based upon a control signal. More specifically, as shown in FIG. 2b, the position of the alteration point P is changed in the manner P1-P4 in dependence upon a control signal from the control unit 10, and this is accompanied by a change in the input/output characteristic, as in the manner $a_{01}-a_{04}$.

Figure 2C:
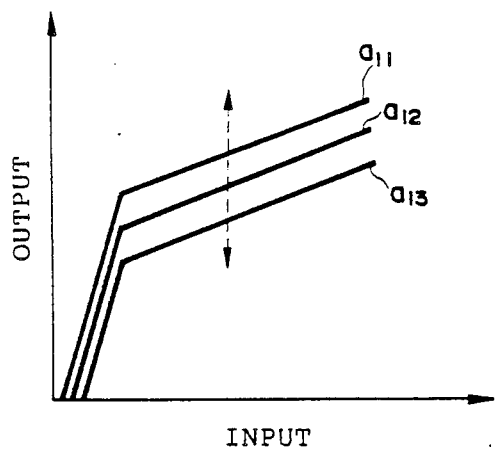

The luminance signal output from the correcting circuit 14 enters the level shifting circuit 15. In dependence upon the control signal provided by the control unit 10, the level shifting circuit 15 shifts, up or down, a DC bias point of the luminance signal from the correcting circuit 14, as shown in FIG. 2c, thereby changing the input/output characteristic in the manner $a_{11}-a_{13}$. The luminance signal output Y1 from the level shifting circuit 15 is applied to the high-level precedence circuit 16. The luminance signal output Y of the matrix circuit 13 also enters the high-level precedence circuit 16.

The high-level precedence circuit 16 delivers either the luminance signal Y or Y1, giving precedence to whichever has the higher level. Accordingly, the luminance signal output Y2 has a characteristic of the kind indicated by the solid line in FIG. 2d. The output Y2 of the high-level precedence circuit 16 becomes the output of the backlight control processing circuit 19.

Figure 2D:
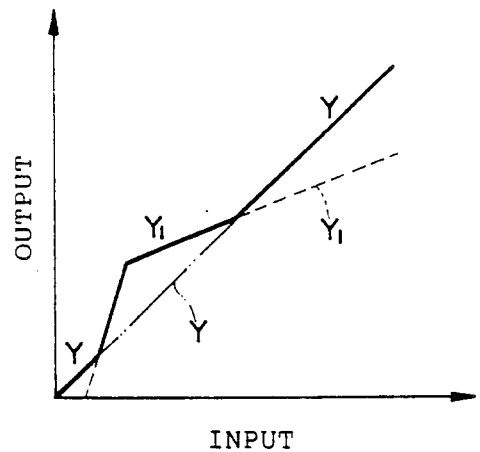

As a result of applying the luminance signal output Y of the matrix circuit 13 to the backlight control processing circuit 19 having the input/output characteristic of the kind shown in FIG. 2d, the level of luminance is emphasized in a suitable range between minimum luminance and maximum luminance, and the vicinity (black level) of minimum luminance and the vicinity (white level) of maximum luminance are suppressed as a result. As a consequence, image quality can be enhanced even if the subject is one having a large luminance difference.

Whether or not backlight control is performed is controlled by a control signal delivered to the high-level precedence circuit 16 from the control unit 10. In a case where the control unit 10 has issued a backlight-control command, the high-level precedence circuit 16 carries out the above-described operation which gives precedence to the high-level signal. If backlight control has been forbidden, the high-level precedence circuit 16 passes the input luminance signal Y at all times and applies this signal to the recording signal processing circuit 17.

FIGS. 4a through 4c illustrate the relationship among the subject (indicated by hatching) and the photometric regions R, $R_{SP}$, an example (in FIG. 4d) of the luminance values Av, Sp conforming to the distance to the subject, the manner (in FIG. 4e) in which the luminance difference between the average luminance Av and spot luminance Sp varies with distance, and the manner (in FIG. 4f) in which the first threshold value, which is for discriminating the luminance difference, varies with distance.

It will be assumed that the subject is darker than the background. Since the subject becomes relatively smaller as the distance to the subject increases, as shown in FIGS. 4a to 4c, the average luminance Av becomes larger. Since spot luminance Sp represents the luminance of the subject, it does not change much when the distance to the subject ranges from near, FIG. 4a, to medium, FIG. 4b. When the distance to the subject becomes long, FIG. 4c, the background enters the region $R_{SP}$ and therefore the luminance Sp rises sharply as shown in FIG. 4d. Accordingly, when the distance to the subject becomes a long distance, the luminance difference between the average luminance Av and the spot luminance Sp becomes small.

If the difference (Av-Sp), shown in FIG. 4c, between the average luminance Av and the spot luminance Sp in a still-video camera is greater than a fixed value, the difference will not fall within the dynamic range of the solid-state electronic imaging device 34. Other difficulties arise as well. Therefore, if the luminance difference is greater than a fixed value, backlight control or strobe-emission processing are carried out, as described below, under the control of the control unit 10.

As set forth above, luminance difference differs depending upon the distance to the subject. Therefore, the first threshold value is varied in dependence upon the distance to the subject. In other words, the first threshold value (especially the higher threshold value) is reduced as the distance to the subject grows, as shown in FIG. 4f. As a result, discrimination of luminance level conforming to reality can be carried out more accurately. It is permissible for the first threshold value to be varied in stages rather than continuously.

FIG. 5 is a flowchart showing the processing procedure of the control unit 10.

A step 51 of the flowchart calls for the average luminance Av and spot luminance Sp to be measured by the photometric element 33, and for the distance to the subject to be measured by the rangefinder unit 41. Next, the average luminance Av is compared with the second threshold value at step 52 to determine whether it is higher than the second threshold value. If the average luminance Av is higher than the second threshold value, the luminance difference between the average luminance Av and the spot luminance value Sp is compared with the first threshold value at step 53 to divide the luminance difference into the large, medium and small categories. At this time the first threshold value is varied in dependence upon the measured distance, as shown in FIG. 4f. The measured distance is discriminated using a suitable threshold value and is categorized into near to medium and far.

Next, it is determined at step 54 whether the auto-strobe mode has been set by the auto-strobe switch 43. When the auto-strobe mode has not been set (NO at step 54), the distance to the subject is near to medium and the luminance difference is large, exposure control based upon the spot luminance Sp is carried out (step 55). As a result, exposure control using the luminance of the subject as a reference is carried out. Consequently, an image appropriate with regard to the subject is obtained.

When the auto-strobe function has been set (YES at step 54), the distance to the subject is near to medium and the luminance difference is large, exposure control based upon average luminance Av is carried out and the strobe is flashed (daytime synchro) (step 56). As a result, a comparatively dark subject at a short distance is illuminated by the strobe. Accordingly, the luminance difference of the entire frame is reduced so that an appropriate image is obtained.

It goes without saying that the above-described exposure control is carried out by adjusting the f-stop value and shutter speed.

Other processing in step 55 will now be described in brief. Exposure is controlled based upon the average luminance Av when the distance is near to medium and the luminance difference is small, and based upon the spot luminance Sp when the distance is near to medium and the luminance difference is medium. Exposure is controlled based upon the average luminance Av when the distance is far and the luminance difference is small. Exposure is controlled based upon weighted mean luminance in accordance with a suitable ratio (e.g., Av:Sp=1:3) between average luminance Av and spot luminance Sp when the distance is far and the luminance difference is medium. Further, when the distance is far and the luminance difference is large, exposure control is performed based upon a luminance which is equal to the average luminance Av minus 1 EV and backlight control is executed.

Other processing in step 56 will now be described in brief. Exposure is controlled based upon the average luminance Av when the distance is near to medium and the luminance difference is small, and based upon the spot luminance Sp when the distance is near to medium and the luminance difference is medium. Since the average luminance is high, the strobe is not flashed even if the auto-strobe mode is in effect. Exposure is controlled based upon the average luminance Av when the distance is far and the luminance difference is small. Exposure is controlled based upon weighted mean luminance in accordance with a suitable ratio (e.g., Av:Sp=1:3) between average luminance Av and spot luminance Sp when the distance is far and the luminance difference is medium. Further, when the distance is far and the luminance difference is large, exposure control is performed based upon a luminance which is equal to the average luminance Av minus 1 EV and backlight control is executed. When the distance is far, a strobe light emission is meaningless and therefore the strobe is not flashed.

Although the same control is performed at near and medium distances at steps 55 and 56, it is permissible to perform different control at each of these distances.

If the average luminance Av is not high (NO at step 52), then it is determined at step 57 whether the auto-strobe function has been set. If the auto-strobe function has not been set (NO at step 57), then exposure control is carried out at step 59 based upon the average luminance Av. If the auto-strobe function has been set (YES at step 57), then photography is performed at step 58 using a light emission from the strobe.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
    first photometry means for measuring a first average luminance of substantially the entirety of an imaged region in a visual field of an imaging optical system;
    second photometry means for measuring spot luminance of a specific small region corresponding to an imaged position of a subject in the imaged region;
    means for determining a second average luminance of the entirety of the imaged region based on said first average luminance and said spot luminance;
    luminance-difference arithmetic means for calculating a difference between the second average luminance and the spot luminance;
    rangefinding means for measuring distance to the subject; and
    mode selecting means for discriminating the luminance difference by using a predetermined threshold value, and selecting a suitable photographic mode in dependence upon results of the discrimination and the distance measured by said rangefinding means;
    wherein the threshold value for discriminating the luminance difference is varied in conformity with the distance measured by said rangefinding means.

2. The camera according to claim 1, wherein the threshold value for discriminating the luminance difference in said mode selecting means is of two types, one type being comparatively high and the other type being comparatively low.

3. The camera according to claim 1 wherein said mode selecting means selects a mode for performing exposure control based upon the spot luminance when the luminance difference is greater than the predetermined threshold value and the distance to the subject measured by said rangefinding means is relatively short.

4. The camera according to claim 3, further comprising means for forbidding a strobe light emission;
    wherein said mode selecting means performs exposure control based upon the spot luminance if the strobe light emission is forbidden.

5. The camera according to claim 4, wherein said means for forbidding the strobe light emission is means for setting an auto-strobe function.

6. A camera comprising:
    first photometry means for measuring a first average luminance of substantially the entirety of an imaged region in a visual field of an imaging optical system;

second photometry means for measuring spot luminance of a specific small region corresponding to an imaged position of a subject in the imaged region;

means for determining a second average luminance of the entirety of said imaged region based on said first average luminance and said spot luminance;

luminance-difference arithmetic means for calculating a difference between the second average luminance and the spot luminance;

rangefinding means for measuring distance to the subject;

means for discriminating the luminance difference by using a predetermined first threshold value, and selecting a suitable photographic mode in dependence upon results of the discrimination and the distance measured by said rangefinding means; and means for discriminating the second average luminance by using a predetermined second threshold value;

wherein if the second average luminance is greater than the second threshold value, calculation of the luminance difference and selection of a photographic mode based upon this luminance difference and the measured distance are performed.

7. A camera comprising:

first photometry means for measuring a first average luminance of substantially the entirety of an imaged region in a visual field of an imaging optical system;

second photometry means for measuring spot luminance of a specific small region corresponding to an imaged position of a subject in the imaged region;

means for determining a second average luminance of the entirety of said imaged region based on said first average luminance and said spot luminance;

luminance-difference arithmetic means for calculating a difference between the second average luminance and the spot luminance;

rangefinding means for measuring distance to the subject; and determining means for determining that the luminance difference is large based upon the luminance difference produced by said arithmetic means and that distance to the subject is short based upon the measured distance;

wherein exposure control is performed based upon the spot luminance if the determination performed by said determining means indicates that the luminance difference is large and the measured distance is short.

8. The camera according to claim 7, further comprising means for forbidding a strobe light emission;

wherein exposure control is performed based upon the spot luminance if the strobe light emission is forbidden.

9. The camera according to claim 8, wherein said means for forbidding the strobe light emission is means for setting an auto-strobe function.

* * * * *